Oct. 2, 1945.         C. A. BIRCH-FIELD         2,385,770
                      PROJECTION IN COLOR
                      Filed Jan. 9, 1942
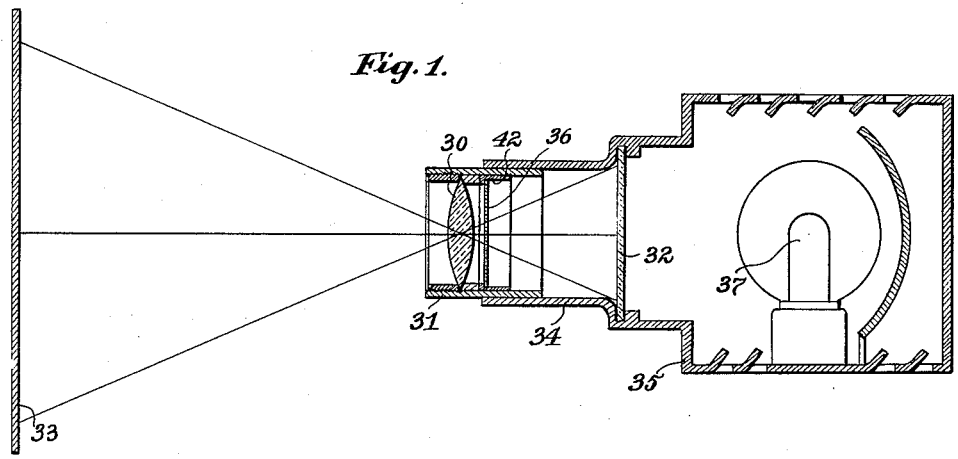
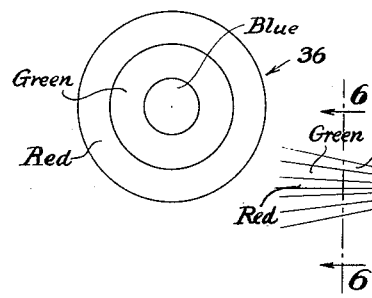
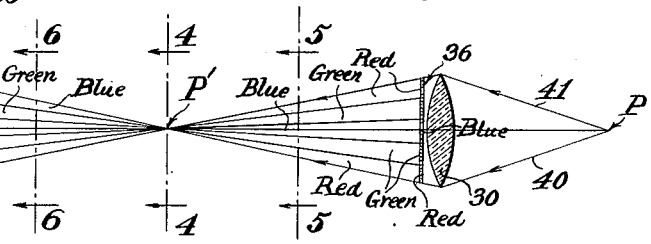
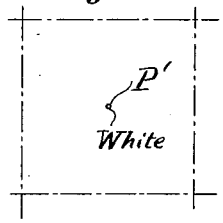
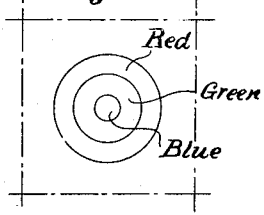
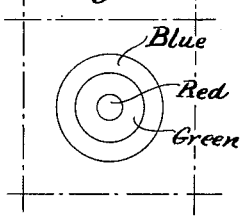
INVENTOR.
Charles A. Birch-Field.
BY
ATTORNEYS Patented Oct. 2, 1945

2,385,770

UNITED STATES PATENT OFFICE 2,385,770

PROJECTION IN COLOR

Charles A. Birch-Field, New York, N. Y.

Application January 9, 1942, Serial No. 426,101

2 Claims. (Cl. 88—24)

This invention relates generally to a method and an apparatus for the production by projection of color effects in the projected image.

My invention can be practiced for example in the production of such effects by projection from a black and white photographically produced object and my disclosure is by reference to this exemplary practice. It will be understood however that this is merely illustrative.

An objective of my disclosed practice is a simple, effective and inexpensive method and apparatus for producing a colored image by optical projection directly from a black and white photographically produced object.

My invention contemplates the provision for the attainment of the above objectives, of a color filter so devised and so related to the lens, and a lens so positioned with relation to the screen that a black and white photographically reproduced object will give a colored projected image.

These objects and such other objects as will hereinafter appear or be pointed out are attained in the illustrative embodiment of my invention shown in the drawing, in which:

Figure 1 is a vertical sectional view, more or less diagrammatic, of apparatus for practicing my improved method of color projection;

Figure 2 is an elevational view of a color filter suitable for use with the apparatus of Figure 1;

Figure 3 is a diagrammatic view illustrating the effects of the color filter of Figure 2 on a beam of white light; and Figures 4, 5 and 6 are views of the appearances on a screen of the pattern produced by the beam of light on a screen positioned respectively in the planes indicated by the lines 4—4, 5—5 and 6—6 of Figure 3, looking in the direction of the arrows, these views being on a scale that is enlarged compared to that of Figure 3.

The apparatus illustrated in Figure 1 comprises a projector lens 30 and a member 36 having differently colored areas associated therewith in a manner and of a character to be more fully described. The lens 30 which may be mounted in any preferred or desired manner is shown in Figure 1 as carried in a cell 31. This cell in turn is slidable within the extension 34 from the projector casing 35 so as to permit of an adjustment of the lens for focusing purposes.

For the attainment of the broader objects of my invention, it is contemplated that the colored transparent member 36 be in relatively close association with the lens 30. The attainment, however, of some of the objects of my invention may call for an adjustment of this colored member with reference to the lens and it will therefore be understood that in connection with the attainment of such further objects that a provision for adjustment is within the purview of my invention.

In the disclosed apparatus, the object 32, the image of which is to be projected on a screen 33, is transparent so that the light from the source 37 will pass therethrough. The object 32 can be a photographic transparency produced conventionally as a black and white. For the most effective practice of my invention, this transparency should be a positive as contra-distinguished from the negative.

The member 36 is made of transparent material and is shown in Figure 2 as comprising colored areas in concentric relation, an arrangement which my invention contemplates where the projection lens is a circularly contoured spherical lens as is the case of lens 30. In this figure, the areas are shown as colored red, blue and green, these colors being selected because of their complementary character and as exemplifying one such combination of colors. Each of these colored areas will transmit light of its own color when white light is projected therethrough and will absorb rays of other colors in accordance with the well known physical laws.

Certain of the objects of my invention will be best served by having the colors of the member 36 arranged in accordance with their wave length and further with the color of the longest wave length outermost and that having the shortest wave length, innermost. This will explain why in Figure 2 the outermost ring is shown colored red, the innermost circular area is shown colored blue and the intermediate area or ring is shown colored green.

Where the image is projected through my color filter conventionally, i. e. with the screen and the lens so spaced that the image is focused rather sharply on the screen, the rays colored by the filter will commingle to give white light. I have discovered however that where the transparent black and white object such as a photographic positive which I employ and the lens are so related to or spaced from the screen that the image does not focus sharply on the screen but to the rear or to the front thereof, the rays of light transmitted through the object and passed through the color filter 36 will give an image with portions thereof colored, and by a proper control of the areas and spacing of the different elements of my apparatus, the colors normal in the original subject can be made to appear in the projected image. For example the blueness of the sky transparent in the positive and white in the normal projection, may in the practice of my invention be shown blue in the projected picture.

I will describe the principles underlying my invention by reference to Figures 3 to 6 inclusive and the control of the spacing of the different elements of my apparatus to effect the objects of my invention in accordance with the aforementioned principles.

In Figure 3 the object is assumed to be a luminous point P emitting white light. The beam of white light bounded by the lines 40 and 41 will pass first through the lens 30 and will emerge with an outermost sheet of red and an inner sheet of green following the principle of chromatic aberration. The point beam is then passed through the transparent member 36. On emerging from the filter the light beam will have been divided into three coaxial beams, the innermost one conical, based on the blue central disc of the filter 36 and containing only blue rays, because rays of other colors will have been absorbed by the said central blue disc of the filter 36. Surrounding the central cone is a conical shell of green light rays, based on the green ring of the filter 36, while the outermost portion of the beam is a conical shell of red rays, based on the red ring of the filter 36. Upon viewing Figure 3 it will be observed that the circular transparent disc has a diameter or width substantially equal to the diameter or width of the beam in the transverse plane in which the member 36 is shown as located in this figure. The adjustability of the member 31 and the suggested adjustability of the member 36 relatively to the lens 30 permit of the attainment of this relation.

If the beam is focused on a screen located in the plane 4—4 of Figure 3, the image of the point P will be a point P' of white light, as shown in Figure 4, the white light being the result of the commingling at this point of the colored rays constituting the beam of rays from the point P after its passage through the lens 30 and the filter 36. However, if the screen is positioned at 5—5 the pattern appearing on the screen will be as shown in Figure 5, from which it will be seen to consist of a central ring of blue, surrounded by rings of green and red. In other words, the pattern of the colored transparent member 36 will be reproduced. If the screen be positioned at 6—6 in Figure 3, the image of Figure 6 will appear thereon. This is similar to Figure 5, but the colors are reversed, red being on the inside instead of on the outside, and blue on the outside instead of on the inside.

If the object is a white surface instead of a single point the image at 4—4 will also be a white surface, but at 5—5 or 6—6 the individual point patterns will overlie each other and color effects will appear wherever the individual colors do not balance each other to produce white light.

If the object is a black and white transparency, this will focus sharply on a screen at 4—4, but when focused either in front of or in back of the screen its image will be found to be colored, but the colors varying and being distributed in dependence on the contours of the object, instead of the image being tinted with a single uniformly distributed color as would be produced with a mono-chromatic filter.

It will be observed that where the image is focused in front of the screen the coloring of the image will be the reverse or complementary to that obtained when the image is focused in back of the screen.

One simple way of devising the transparent colored member 36 is in the form of an arrangement which can be associated with a conventional projecting apparatus now in use, and as illustrated in Figure 1. It comprises the casing 42 made of any preferred or desired materials, such as cardboard for example, within one end of which the filter 36 is carried. The outer dimensions of the casing or tube 42 are such that it will be received within the bore of the extension 34, so that it will maintain itself in a spatial relation to the lens such as shown in Figure 1, in which the tube 42 is so positioned so as to present the filter 36 in proximity to the lens.

The filter may be made of any suitable transparent material. I have found transparent synthetic plastic material in sheet form to the surface of which suitable transparent coloring matter has been applied, satisfactory in practice. Obviously however transparent material that is colored through and through may be used.

Having thus described my invention and illustrated its use, what I claim as new and desire to secure by Letters Patent is:

1. A method of producing colored effects in images produced on a screen by projection from a black and white positive, which method comprises projecting the white light from the black and white positive upon a screen positioned in a plane other than the plane of the focus of the beam to give chromatic projection, subjecting the white light beam from each point of said positive to the action of a member having a transparent area of circular conformation, said area being comprised of a central circular portion of a color of relatively low wave length and of concentric annular bands each of a different color of a higher wave length, said member being interposed in the path of the composite beam from all the points of said object, in a plane in the region of maximum separation of these colored components of the white light from the object which have the higher wave lengths, the diameter of the transparent area of said member being substantially equal to and registering with that of the projected beam and the differently colored areas of which the transparent beam is comprised being of a width corresponding to the width of its relation color in the composite beam and the colored area being arranged to register with the separated color portions of the composite beam which are of the same color.

2. A method of producing colored effects in images produced on a screen by projection from a black and white positive, which method comprises projecting the white light from the black and white positive upon a screen positioned in a plane other than the plane of the focus of the beam to give a chromatic projection, subjecting the white light beam from each point of said positive to the action of a member having a transparent area of circular conformation, said area being comprised of a central circular portion of a color of relatively low wave length and of concentric annular bands each of a different color each of a relatively higher wave length, said member being interposed in the path of the composite beam from all the points of said object, in a plane in the region of maximum separation of these colored components of the white light from the object which have the higher wave lengths, the diameter of the transparent area of said member being substantially equal to and registering with that of the projected beam and the differently colored areas of which the transparent area is comprised being each of a width corresponding to the width of its related color in the composite beam and the colored area being arranged to register with the separated color portions of the composite beam which are of the same color, said transparent member being adjustable to bring it into the desired location.

CHARLES A. BIRCH-FIELD.